United States Patent

[11] 3,572,647

[72] Inventor Hans Peter Staheli
    Pratteln, Switzerland
[21] Appl. No. 804,164
[22] Filed Mar. 4, 1969
[45] Patented Mar. 30, 1971
[73] Assignee Buss A. G.
    Basel, Switzerland
[32] Priority Mar. 8, 1968
[33] Switzerland
[31] 3413/68

[54] PROCESS AND APPARATUS FOR HANDLING MATERIALS IN DUST AND POWDER FORM
    4 Claims, 1 Drawing Fig.
[52] U.S. Cl. .................................................. 259/25
[51] Int. Cl. .................................................. B01f 7/02
[50] Field of Search .................................... 259/9, 10,
    109, 110, 25, 26, 23, 24, 8, 43, 44, 66, 67, 68, 69

[56] References Cited
UNITED STATES PATENTS

| | | | |
|---|---|---|---|
| 3,019,895 | 2/1962 | Loevenstein | 259/9 |
| 3,023,455 | 3/1962 | Geier | 259/9 |
| 3,346,240 | 10/1967 | Lavelle | 259/26 |
| 3,456,924 | 7/1969 | Dietert | 259/64 |

Primary Examiner—Robert W. Jenkins
Attorney—Tab T. Thein

ABSTRACT: Process and apparatus for handling materials in dust and powder form, comprising the steps of, and means for, filling materials into a feeding device, venting and precompacting the materials therein, feeding them into a mixing and kneading device, further venting, compacting and transferring them in said last-named device, and applying heat therein. The feeding device has a venting insert, and the kneading device has a worm shaft.

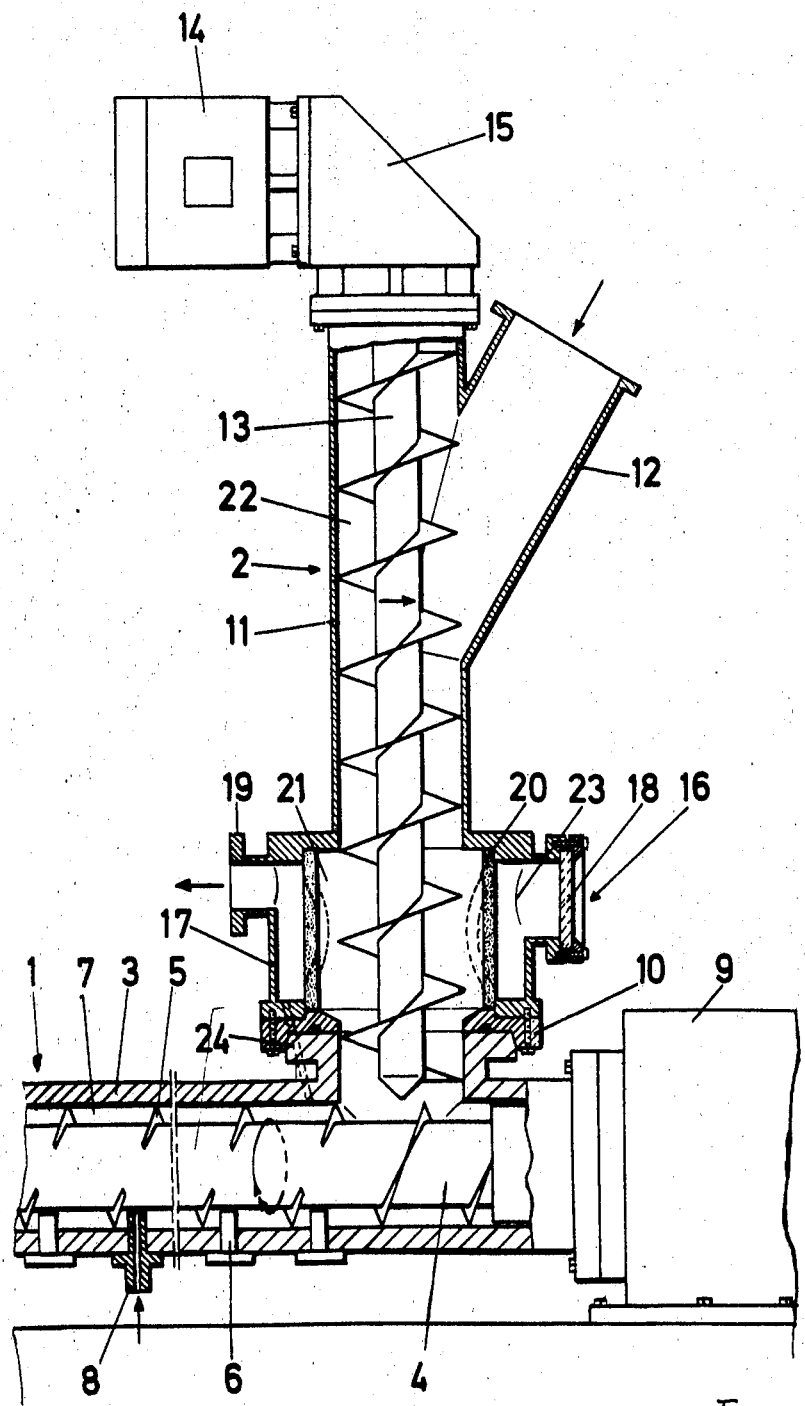

PROCESS AND APPARATUS FOR HANDLING MATERIALS IN DUST AND POWDER FORM

The present invention concerns a process for handling materials in dust and powder form, which are being fed by a feeding device into a mixing and kneading device in which they are to be compacted and transferred, possibly with heat supplied. The invention also discloses suitable apparatus to carry out the proposed process.

It is well known in processing operations that often the task arises to compact a material present in form of powder or dust, mostly coming from a preceding drying operation, and either to feed the material directly into a subsequent unit operation or to divide the obtained compacted agglomerates as uniformly as possible into a granulated form. For this duty, mixing and kneading devices provided with a feeding device are employed, but difficulties are experienced when transferring and compacting materials in dust and powder form.

Dusts and powders consist of particles in the finer grain sizes, having very low bulk density owing to the large number of particles with corresponding many grain boundaries; therefore the bulk weight remains low, which is a disadvantage.

With very small particles there result also disadvantageous ratios of particle weight to particle surface in a manner where the weight per surface becomes so small that the particles are supported by minute air cushions even when at rest. Air inclusions can spread apart the particles and further loosen the packing, and the bulk weight becomes even lower. At the same time, such material tends to flooding which means it behaves like a fluid. Depending on displacements due to air inclusions, on static charges or the like, the powder may start depositing and bridging in the feeding devices, again resulting in serious disadvantages.

A further and often decisive inconvenience results from powder and dusts, even if predried, retaining or eagerly reabsorbing humidity because of the large total surface and the access given owing to the fineness, to cleavages and pores, the humidity being set free in most cases during the subsequent processing. Added to this is the known fact that vapors or gases set free during processing will often blow back into the feeding device, causing disturbances.

In the subsequent processing equipment the precompacted powders are definitely densified or even agglomerated to form a bound mass. This is done under the influence of pressure or heat, singly or in combination, as may be required.

Also with this processing technique disadvantages are experienced. On one hand it has often not been possible to prevent partial loss of the precompacted state during entering into the subsequent processing equipment, which means that part of the powders fluidized again and could be densified only with difficulty. On the other hand it has not always been possible to obtain the final densified state homogeneously, especially when agglomeration of the powders was combined with fusion. If then the agglomerates have to be divided again to obtain a granular material then the known technique had the serious inconvenience to give too large a proportion of dust as a result of the size reduction.

It is the object of the invention to disclose a method and apparatus which permits to prevent occurrence of the above disadvantages.

The inventive process for handling materials in dust and powder form comprises the steps of:
a. filling the materials in a feeding device;
b. venting and precompacting the materials in said feeding device;
c. feeding the materials into mixing and kneading device;
d. further venting, compacting and transferring the materials in said mixing and kneading device; and
e. applying heat to the materials in said mixing and kneading device.

The apparatus according to the invention for handling materials in dust and powder form comprises a horizontally arranged mixing and kneading device with a rotating and reciprocating worm shaft, a feeding device arranged vertically, preceding said mixing and kneading device and having an inlet opening for the materials to be handled, the housing of said feeding device comprising a venting insert having a connection either to a vacuum source or to a pressure source comprising a filtering sleeve between said connection and the inside of the treatment chamber. Gaseous inclusions are removed simultaneously with the feeding and precompacting of dusts and powders.

If the treatment chamber of the mixing and kneading device is connected to the vent insert then vapors formed in the mixing and kneading device are also removed, whereby repeated fluidizing is prevented in the treatment equipment.

Preferably the vent insert can consist of a cylindrical case with a cylindrical filtering sleeve which is made from porous, possibly elastically deformable material. The space between the filter sleeve and the casing, which is placed under vacuum or pressure, can be connected by a bore with the interior of the treatment chamber of the mixing and kneading device. If pressure is applied briefly instead of vacuum, the filter is cleaned so that the pores are not occluded.

In the sole FIGURE of the accompanying drawing a preferred exemplary embodiment of the proposed handling apparatus is shown in a somewhat schematic vertical section.

The apparatus for handling of materials in dust and powder form consists of a horizontal mixing and kneading device 1 and a vertical feeder 2. The device 1 is provided with a cylindrical casing 3 (only drawn partially) in which a rotating kneading screw 4 is arranged, possibly also having a reciprocating to and fro movement. This screw has interrupted flights 5 which work in combination with replaceable teeth 6. The teeth go through the wall of casing 3 and project into a treatment chamber 7. An injection pipe is marked 8 through which protective gas might be bled into the interior of casing 3. The drive of the kneading screw 4 is arranged in conventional manner through an electrical motor and gear unit placed in a casing 9.

On the inlet of the mixing and kneading device 1 a flange 10 is provided to which the lower end of the vertical feeder 2 is connected. This has a cylindrical casing 11 with an inlet branch or flange 12 for the dusts and powder to be treated. A feeding screw 13 is located in casing 11 and driven by a motor 14 over a right-angle gear transmission 15. The lower end of feeder 2 is provided with a vent insert 16.

The insert 16 has a cylindrical casing 17 with an observation window 18 and has a radial flange 19 for connection to a source creating vacuum or pressure. Inserted in the casing 17 is a cylindrical filter sleeve 20 of porous and possibly elastically deformable material which forms a chamber 21 being a continuation of a chamber 22 of casing 11.

The space 23 between the filter sleeve 20 and casing 17 is connected by a bore 24 (shown in broken lines) with chamber 7.

The materials to be treated are fed through the inlet flange 12 into feeder 2 and are transferred vertically down by screw 13. An underpressure is created in chamber 23 by connecting vacuum to flange 19, which results in venting the material under treatment. Here the vacuum acts on the material only indirectly, not influencing the movement of the feeder screw.

A covering layer of powder settles initially on the inner face of the filter sleeve 20 thus serving as a filter medium for fines. To prevent occlusion of the ingress to the filter pores one can quickly remove this powder layer, if necessary, by applying briefly pressure instead of vacuum. The vented material passes into the mixing and kneading device 1 where possibly additionally forming gases are vented through bore 24. If required protective inert gas can be bled in through pipe 8 when the treatment chamber is isolated from the vented part in a known manner as for example by a restriction forming a material plug.

Tests performed have shown that especially difficult processing problems can be solved with the and of the proposed process and apparatus.

It has been possible to process polyolefine powder continuously where the polymer from the chemical reaction has been washed and dried as usual and was stored in a silo and then premixed with additives before being passed into the feeder.

For technical reasons it is not well possible to keep the raw polymer conditioned in silo storage with respect to residual humidity. Therefore the percentage of the residual humidity varies from one storage silo to another. One has also to expect humidity being again absorbed during prolonged storage. The material is in form of dust to powder and shows tendency to fluidization and running. Even minor changes of the contained residual humidity change considerably the feeding behavior of the material especially when vapor bubbles form out of the material humidity in a treatment machine and flow back into the feed arrangement, thereby fluidizing fresh feed and preventing a smooth intake. This becomes clear when observing the throughput which can vary between 200 to 550 kgs./h with the same machine group and otherwise constant material but having varying residual humidity.

It has been possible with the proposed equipment to increase the throughput to a constant value of 600 kgs./h which is no longer influenced by a variation in residual humidity of the raw materials. After densification the melt could be placed under further vacuum at the kneader outlet and transfer pelletizer screw so that a nonpolymerized content of monomer was evacuated.

When producing press masses from thermosetting resins, then fillers are impregnated with resin mixed with pigment and other additives and reground to high fineness to obtain later pressed articles with uniform color and clean surfaces.

The very fine powders have to be densified and granulated before they are suitable for for feeding the presses. It is also very advantageous if the degree of polymerization can be accurately adjusted during this processing step so that the desired flow time in the automatic presses can be correspondingly uniformly regulated. It is known that such an exact adjustment of the flow time properties is done in many cases with the aid of single-screw machines in which the densification is combined with homogeneous mixing, kneading and controlled partial fusion. Subsequently the material is formed into chips which after cooling are broken to fine granules.

The throughput of a production unit has been up to now from 250 to 400 kgs./h and had to be adjusted to between 3 percent to 6 percent of the material. The humidity of the material resulted in vapor formation inside the kneader and during the partial fusion. Vapor blew the powder feed back and prevented, together with the air inclusions, any throughput increase.

The same production unit was rebuilt including the inventive equipment and then gave an increase of average throughput to 600 kgs./h. Noticeable further advantage was the large constancy of operating conditions which are not influenced by the air inclusion and residual humidity of the feed-in powder premix. Noticable too is the further improved homogeneity resulting in keeping the dust content below 10 percent during the subsequent breaking operation.

Furthermore it proved an advantage that the density of the coarse granulate was increased due to feed-in venting and subsequent venting, the granulate having less porous inclusions.

I claim:

1. A process for handling materials in dust and powder form, comprising the steps of:
   a. filling said materials in a feeding device;
   b. venting and precompacting said materials in said feeding device;
   c. feeding the materials into a mixing and kneading device;
   d. further venting compacting and transfering said materials in said mixing and kneading device; and
   e. applying heat to said materials in said mixing and kneading device.

2. An apparatus for handling of materials in dust and powder form, comprising a horizontally arranged mixing and kneading device with a rotating and reciprocating worm shaft, a feeding device arranged vertically preceding said mixing and kneading device and having an inlet opening for the materials to be handled, the housing of said feeding device comprising a venting insert having a connection either to a vacuum source or to a pressure source and comprising a filtering sleeve between said connection and the inside of the treatment chamber.

3. An apparatus according to claim 2, in which said venting insert comprises a cylindrical housing with a cylindrical filtering sleeve said filtering sleeve, consisting of a porous and elastically deformable material.

4. An apparatus according to claim 2, in which there is provided a bore connecting the space between the filtering sleeve and the housing to the treatment chamber of the mixing and kneading device.